Nov. 1, 1949     W. A. KOSTER     2,486,715
CONSTRUCTION FOR PREVENTING DISENGAGEMENT OF GEARS
Filed Jan. 8, 1948
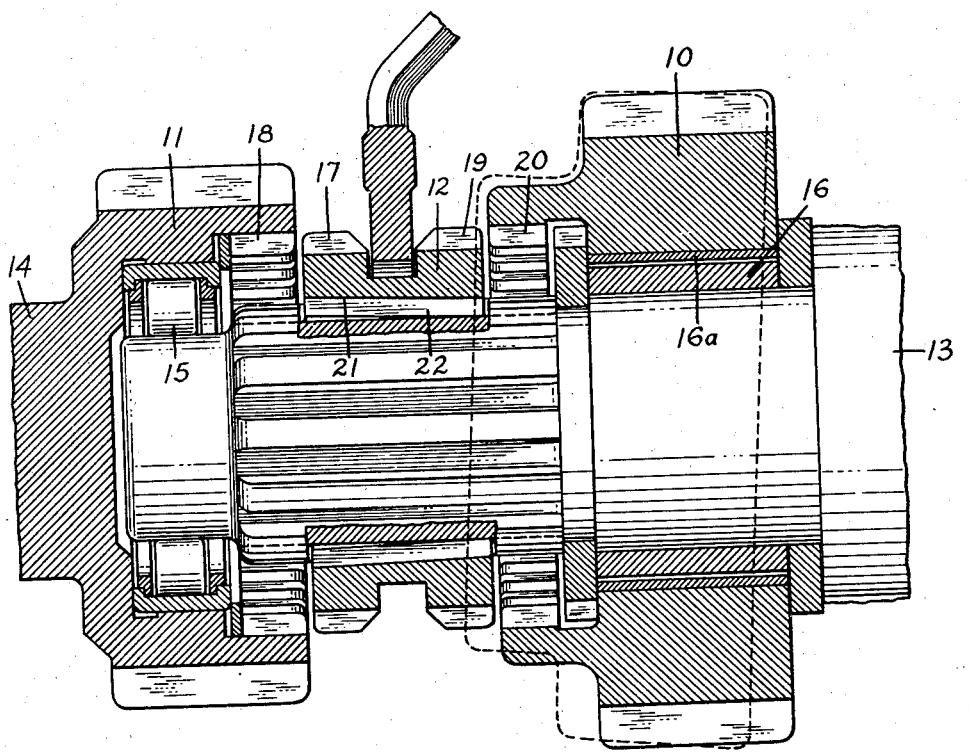
INVENTOR.
WILLIAM A. KOSTER
BY
HIS ATTORNEYS.

Patented Nov. 1, 1949

2,486,715

UNITED STATES PATENT OFFICE 2,486,715

CONSTRUCTION FOR PREVENTING DISENGAGEMENT OF GEARS

William A. Koster, Highland Park, N. J., assignor to Mack Manufacturing Corporation, New York, N. Y., a corporation of Delaware Application January 8, 1948, Serial No. 1,253

2 Claims. (Cl. 192—67)

This invention relates to constructions for preventing inadvertent disengagement of gears and clutches in power transmitting systems. It relates more particularly to constructions for preventing inadvertent or unwanted disengagement of clutches or gears of vehicle transmissions.

In a certain percentage of all production sliding gear transmissions, one of the gears, usually the fourth speed gear, has a tendency to disengage when the loading through the gears reverses, for example, when the vehicle tends to drive the engine while coasting down hill. Because this unwanted gear disengagement is sometimes dangerous and is a source of complaint on the part of the users of the equipment, many different systems or devices have been suggested for overcoming it. For example, devices have been provided for locking the gears or clutches in engaged position. It has been suggested also that the teeth of the gears or clutches could be modified to cause them to interlock so long as a load is applied to them. While these and other systems or devices have been successful in preventing gear or clutch disengagement, they have produced another disadvantage, namely, difficulty in shifting the gears because of the interlocking relationship of the elements.

Careful analysis and study of the problem of preventing gear disengagement has led to the discovery that gear or clutch disengagement occurs for the reason that one of the gear or clutch elements tilts with respect to the other cooperating gear or clutch element when the load is reversed with the result that a thrust is created which tends to spiral the clutch elements or gear elements out of engagement. Tilting of the gear or clutch element is an indirect result of manufacturing practice. In all mass production operations, it is customary to allow certain tolerances in the size of parts so that all like parts will be interchangeable. Also, when gear or clutch elements are mounted on bearings or bushings, clearances must be provided to allow space for oil films to reduce friction. In some cases, the manufacturing tolerances and clearances pyramid with the result that when the gear or clutch elements of a transmission are assembled, one of the gear or clutch elements is slightly loose and can tilt relatively to the other gear or clutch element. Doubtless such tilting could be overcome by more precisely fitting all of the parts, but such precision fitting is not practical or economically feasible in heavy duty equipment such as, for example, truck or bus transmissions.

An object of the present invention is to provide a simple structure for overcoming the tendency of gear and clutch elements to disengage upon reversal of the load thereon.

Another object of the present invention is to provide mechanism for preventing gear or clutch disengagement despite variations in size within manufacturing tolerances, without modifying the shifting characteristics of the transmission.

Other objects and advantages of the present invention will become apparent from the following description of a typical construction embodying the present invention.

In accordance with the present invention, I have found that when the spline structure of the shiftable gear or clutch element is suitably modified to provide a taper therein which will permit rocking of the shiftable clutch element relative to its supporting shaft or other structure, any tendency of a cooperating gear or clutch element to tilt will be followed closely by the shiftable element, thereby keeping them parallel and preventing the development of a thrust which would tend to cause disengagement of the elements.

For a better understanding of the present invention, reference may be had to the accompanying drawing in which:

The figure is a view in section of a portion of a transmission including a pair of transmission gears and a shiftable clutch element for cooperation therewith.

It will be understood from the following description, that the present invention is applicable to many different types of clutch and gear arrangements and that the specific gear and clutch arrangement described hereinafter is illustrative only of the invention.

Referring now to the drawing, a portion of vehicle transmission is disclosed therein, including a fourth speed gear 10, a direct speed gear 11 and a shiftable clutch element 12. The shiftable clutch element 12 is connected to the main shaft 13 of the transmission, for example, while the gear 11 is mounted, for example, on the output shaft 14. The gear 11 is integral with the shaft 14 and is further maintained concentric with the shaft 13 by means of a suitable anti-friction bearing structure 15.

The gear 10, as illustrated, is mounted on a sleeve 16 carried by the main shaft so that it can rotate relatively to the main shaft. The gear 10 may be provided with an internal bronze bushing 16a rotating on the sleeve 16.

No difficulty is encountered in maintaining engagement between the clutch teeth 17 of the shiftable clutch element 12 and the internal clutch teeth 18 on the gear 11 for the reason that the gear 11 is maintained substantially rigid and cannot tilt or change its relation with respect to the shafts 14 and 13. On the other hand, the gear 10 and its sleeve 16 do not fit tightly for the reason that space must be provided for an oil film between the bushing 16a and the sleeve 16. The space between the bushing 16a and the sleeve 16 may be increased because of variations in the size of the opening in the bushing and the diameter of the sleeve, within manufacturing tolerances.

Therefore, the gear 10 may be sufficiently loose to permit it to tilt, as indicated in an exaggerated manner in dotted lines in the drawing. Due to this tilted relationship, the teeth 19 and 20 on the elements 10 and 12 engage at an angle and the thrust between the teeth 19 and the teeth 20 has an axial component which tends to urge the clutch element 12 to the left.

The present invention involves a modification of the relation between the clutch element 12 and the shaft 13 for offsetting relative tilting of the gear 10 and the clutch element 12. The modification consists in tapering the internal bore 21 and the splines 22 of the clutch element 12 so that the opening at the end of the clutch element 12 adjacent the gear 10 is of smaller diameter than the opening at the opposite end of the clutch element 12. This taper may be such as to make the diameter of the opening at the left-hand end of the clutch element 12 on the order of five to eleven thousandths of an inch greater than the diameter at the right-hand end of the opening. A taper of seven thousandths of an inch has proved to be adequate to prevent clutch or gear disengagement under most conditions. The taper in the internal opening and splines of the clutch teeth permits the clutch element 12 to rock relative to the shaft 13 so that when the gear 10 rocks or tilts with respect to the shaft 13, the clutch element 12 also rocks relative to the shaft 13 and remains parallel with the gear 10. Under these circumstances, the clutch teeth 19 and 20 remain parallel and an axial thrust is not developed which would urge the clutch 12 axially out of engagement with the gear 10.

It will be understood, as indicated above, that constructions of the type described above are applicable to other types of transmissions and to many types of toothed or dog clutches, and, therefore, the form of the invention described above should be considered as illustrative and not as limiting the scope of the following claims.

I claim:

1. A clutch construction comprising a shaft having splines thereon, a first toothed element rotatably mounted on said shaft with capacity for limited tilting movement relative to said shaft, a cooperating toothed element mounted on said shaft for axial movement into and out of engagement with said first toothed element, said cooperating toothed element having an opening and splines therein non-rotatably engaging the shaft splines, said opening and said splines being tapered inwardly toward said first toothed element to permit tilting of said cooperating clutch element relative to said shaft to retain it in parallelism with said first toothed element.

2. A gear transmission comprising a shaft, a first toothed element rotatably mounted on said shaft and being capable of unwanted limited tilting movement relative to said shaft, a second cooperating toothed element, slidable on said shaft into and out of mesh with the first toothed element, said second toothed element having an axially tapered opening therethrough receiving said shaft to permit limited tilting movement of said second element to maintain it parallel with said first element when said elements are in mesh, said opening being of smaller diameter at the end adjacent to said first toothed element than at its opposite end and said shaft and said second member having interfitting splines, the splines on said second member having inclined inner edges corresponding to the taper of said opening.

WILLIAM A. KOSTER.

REFERENCES CITED

The following references are of record in the file of this patent:

UNITED STATES PATENTS

| Number | Name | Date |
|---|---|---|
| 1,818,932 | Rieger | Aug. 11, 1931 |
| 2,009,507 | Matthews | July 30, 1935 |

FOREIGN PATENTS

| Number | Country | Date |
|---|---|---|
| 403,943 | Great Britain | 1933 |